US012705951B1

(12) United States Patent
Highley

(10) Patent No.: US 12,705,951 B1
(45) Date of Patent: Aug. 11, 2026

(54) GAMING BOUNTY AGGREGATION AND MANAGEMENT DEVICE

(71) Applicant: Salty Crew Poker LLC, Edmonds, WA (US)

(72) Inventor: Patrick Highley, Edmonds, WA (US)

(73) Assignee: Salty Crew Poker LLC, WA (US)

( * ) Notice: Subject to any disclaimer, the term of this patent is extended or adjusted under 35 U.S.C. 154(b) by 0 days.

(21) Appl. No.: 19/391,451

(22) Filed: Nov. 17, 2025

Related U.S. Application Data

(63) Continuation of application No. 19/390,039, filed on Nov. 14, 2025.

(51) Int. Cl.
*G07F 17/32* (2006.01)

(52) U.S. Cl.
CPC ........ *G07F 17/323* (2013.01); *G07F 17/3241* (2013.01); *G07F 17/3276* (2013.01); *G07F 17/3293* (2013.01)

(58) Field of Classification Search
CPC .. G07F 17/322; G07F 17/323; G07F 17/3241; G07F 17/3272; G07F 17/3276; G07F 17/3288; G07F 17/3293; A63F 3/00157; A63F 1/00; A63F 1/18; A63F 2001/005; A63F 2003/00164
See application file for complete search history.

(56) References Cited

U.S. PATENT DOCUMENTS 11,120,668 B1 9/2021 Hicks et al.
2005/0173862 A1* 8/2005 Orenstein ................. A63F 1/18 273/292
2005/0215300 A1* 9/2005 Oliveras ................. G07F 17/32 463/13
2012/0184367 A1 7/2012 Parrott et al.
2019/0096186 A1* 3/2019 Oberberger ......... G07F 17/3239
2021/0287495 A1* 9/2021 Hicks .................. G07F 17/3237

OTHER PUBLICATIONS

"HRC 1.4 Update: KO/PKO Bounty Tournaments". Holdemresources.net. [dated Jun. 3, 2018], [online], [retrieved on Jan. 16, 2026]. <URL:https://web.archive.org/web/20180622170633/https://www.holdemresources.net/blog/hrc-1v4-update-knockout-bounty/>. 6 Pages. (Year: 2018).*
"The Theory of Progressive Knockout Tournaments". GTO Wizard Blog. [dated Jun. 2, 2023], [online], [retrieved on Jan. 16, 2026]. <URL:https://blog.gtowizard.com/the-theory-of-progressive-knockout-tournaments/>. 17 Pages. (Year: 2023).*

* cited by examiner

*Primary Examiner* — Milap Shah
(74) *Attorney, Agent, or Firm* — Lee & Hayes, P.C.

(57) ABSTRACT

This disclosure describes techniques for managing bounty information across players for use in a tournament that makes use of bounties. In the disclosed system, bounty amounts are transferred and aggregated as players are eliminated. A first bounty amount maintained in relation to a first bounty tracking device for an eliminated player is aggregated with a second bounty amount maintained in relation to a second bounty tracking device for an eliminating player to generate a current bounty amount. The current bounty amount is stored in a local memory of the second bounty tracking device. The second bounty tracking device is configured to present an indication of that current bounty amount to an outside observer.

19 Claims, 9 Drawing Sheets

GAMING BOUNTY AGGREGATION AND MANAGEMENT DEVICE

CROSS REFERENCE TO RELATED APPLICATION

This U.S. patent application is a continuation of and claims priority to co-pending and commonly associated U.S. patent application Ser. No. 19/390,039, filed on Nov. 14, 2025, the entirety of which is incorporated herein by reference.

BACKGROUND

A bounty is a feature in some poker tournaments that rewards a player for eliminating another player. Depending on the tournament, a player might be rewarded for eliminating either a specific player that has been assigned a bounty, or any player enrolled in the tournament. In bounty tournaments that use a bounty system, each player may be in possession of their own bounty chip, or token, that represents his or her bounty. This bounty chip is carried by the player throughout the tournament, and, if the player is eliminated, is given to the player who eliminated them. The bounty chips can be cashed in for the amount each player paid for their respective bounty chip. The winner can usually cash in any bounty chip, including their own, but it is generally improper to hold back (or conceal) bounty chips during play to prevent their loss.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
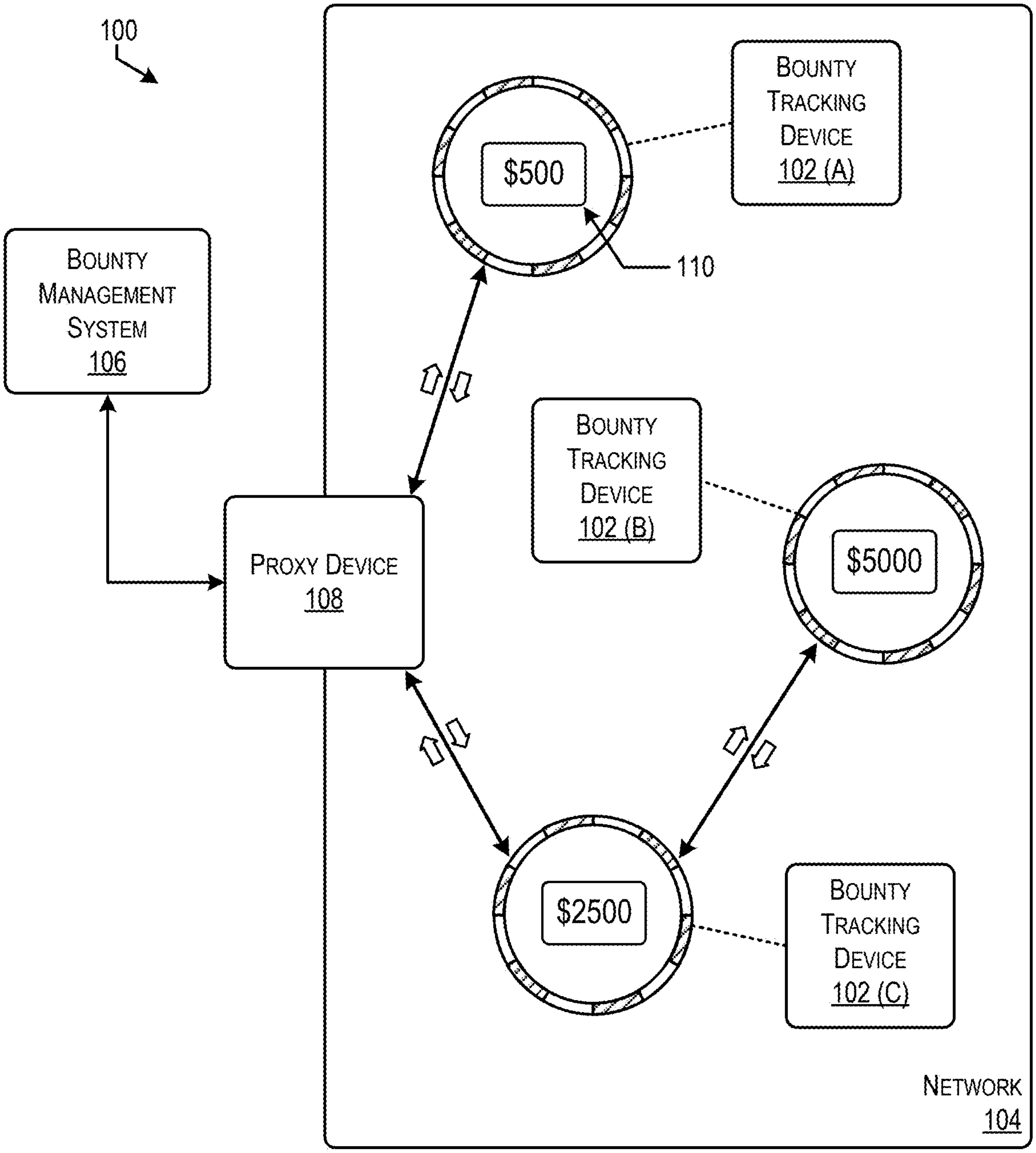
FIG. 1 depicts an example environment in which a system may be implemented to enable management of bounty information in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

This disclosure describes, in part, a system for accurately managing/tracking bounties for players enrolled in a tournament. In embodiments, the system allows for bounty/player data to be aggregated onto, moved between, bounty tracking devices in wireless communication with a management system over a network connection.

In embodiments, a bounty tracking device may include any electronic device configured to operate using low power in order to aggregate and present bounty information for a user/player. In embodiments, the bounty tracking device may include at least a wireless transceiver for communicating with other electronic devices and a local memory for storing bounty information. In some cases, the bounty tracking device includes one or more output components for presenting information about a player's bounty. For example, the bounty tracking device may include a display screen configured to display a portion of bounty information. In another example, the bounty tracking device may include a light source (which may be visible through a transparent or translucent housing component) configured to indicate a current bounty level for a player. By way of illustration, the light source may be configured to change colors in order to emit a light in a color and/or intensity that is indicative of a bounty level. In another example, the bounty tracking device may include a speaker or other audio output component capable of emitting an audio signal.

In the disclosed system, each time that one player has defeated another, bounty information associated with the defeated player is transferred from his or her bounty tracking device to a bounty tracking device operated by the defeating player. A bounty amount associated with the defeated player (or a portion thereof) is then aggregated with a bounty amount associated with the defeating player on the bounty tracking device to generate a new bounty amount now associated with the defeating player. That bounty amount is then presented via at least one output component of the bounty tracking device.

It should be noted that there are a number of ways in which bounties can be implemented in a gaming (e.g., Poker) tournament. In a first example, in a standard knockout tournament (SKO), a fixed portion of each player's buy-in is allocated as a bounty. When a player eliminates an opponent, they receive the full bounty amount associated with that player.

In a second example, in progressive knockout tournaments (PKO), the bounty system is dynamic, in that when a player eliminates an opponent, they receive a portion of the opponent's bounty, while the remaining part is added to their own bounty. This creates escalating incentives as the tournament progresses. For example, in many PKO tournament formats, 50% of the eliminated player's bounty is awarded to the eliminator, and the other 50% increases the eliminator's own bounty.

In a third example, mystery bounty tournaments introduce an element of chance. After reaching a certain stage in the tournament, players who eliminate opponents draw from a pool of concealed bounty prizes, which can vary significantly in value.

While many bounty tournaments assign bounties to each of the players that are enrolled in that tournament, some bounty tournaments assign a bounty to only a few players.

This assignment may typically be pre-arranged with the players who are to have bounties on them, as such an assignment to a random entrant would significantly affect their game. Some tournaments may feature a celebrity bounty, if the tournament hosts have arranged for a celebrity to play in the tournament. This type of bounty arrangement is usually only the celebrity bounty variety, or if the player with a bounty on them is promoting the tournament.

It should be recognized that a player having a bounty in a tournament can significantly affect the play of the tournament. For example, if a player with a lower bounty (as conventionally represented by a lower number of bounty chips) declares that they are all-in, other players may be less enticed to call the bet and it would result in the all in player gaining additional fold equity. Most professional poker players would alter their normal playing style to adapt to this aspect if they were to enter a bounty tournament. Accordingly, in conventional bounty systems that may use physical tokens to track bounties, a player with a high bounty may be enticed to conceal a portion of his or her bounty chips in order to appear to be a player with a lower bounty.

Embodiments of the disclosure provide for a number of advantages over conventional systems. For example, embodiments of the disclosure allow for simplified management and/or presentation of bounty information for use in a tournament that includes the use of bounties by reducing the opportunities for errors and increasing game security. Notably, embodiments of the disclosure provide for easy determination of a bounty associated with any particular player while preventing obfuscation of bounty data by that player. Notably, some embodiments of the disclosure may provide for easy assessment of a level of skill/threat associated with a player.

Additionally, embodiments of the disclosure may provide for additional security benefits by enabling tracking of wins/losses. For example, chip dumping is a form of cheating in poker where one player deliberately loses their chips to a conspirator to transfer funds and gain an unfair advantage. In a chip dumping scheme, two or more players agree to cooperate at a poker table, with one person "dumping" chips to the other. By unfairly consolidating chips, colluding players can manipulate the flow of the game to ensure one of them wins the tournament. Embodiments of the disclosure allow for tracking of lifetime wins/losses for a player against other players, allowing the disclosed system to identify patterns that might correspond to a chip dumping scheme.

FIG. 1 depicts an example environment in which a system may be implemented to enable management of bounty information in accordance with at least some embodiments. In the environment 100, a number of bounty tracking devices 102(A-C) operating on a network 104. The number of bounty tracking devices 102(A-C) may be in communication with a bounty management system 106 via one or more proxy device 108.

Each of the bounty tracking devices 102 may include the hardware and functionality to communicate with various types of other electronic devices over network 104. For example, the bounty tracking devices 102 may have the hardware and functionality to communicate with a proxy device 108 and/or another bounty tracking device 102. In some embodiments, the bounty tracking device 102 may operate using a number of different communication protocols. By way of non-limiting example, such communications may include LoRa® radio (referred to as SubG-CSS), Bluetooth® Low Energy (referred to as BLE), X10, RS-485, 6LoWPAN, Low Power Time Synchronized Network (LPTSN), Bluetooth LE (BLE), ZigBee, Z-Wave, and/or a low power wide-area networks (LPWAN), such as a chirp spread spectrum (CSS) modulation technology (e.g. LoRa) or network protocol (e.g., LoRaWAN), an Ultra Narrow Band modulation technology network (e.g., Sigfox, Telensa, NB-IOT, etc.), RingNet, and/or the like.

The bounty tracking device 102 preferably supports suitable wireless communication protocols. For example, the bounty tracking device may implement the Bluetooth 4.0 standard, including communications capabilities for classic Bluetooth as well as Bluetooth Low-Energy (BTLE). The Bluetooth radio preferably switches between classic Bluetooth and Bluetooth Low-Energy, but may additionally or alternatively be capable of communicating over both simultaneously.

The bounty tracking device 102 preferably includes at least one antenna; additionally or alternatively, the Bluetooth radio may include an interface to connect to an external antenna. Antennas may be of a variety of antenna types; for example, patch antennas (including rectangular and planar inverted F), reflector antennas, wire antennas (including dipole antennas), bow-tie antennas, aperture antennas, loop-inductor antennas, ceramic chip antennas, antenna arrays, and fractal antennas.

The bounty tracking device 102 may additionally or alternatively include any other hardware. For example, the bounty tracking device 102 may include a USB interface (for connection of network-attached storage, a DLNA server, etc. or for configuration purposes). In one embodiment, the bounty tracking device 102 includes a hardware encryption module (HEM). The HEM is preferably a chip that stores an encryption key securely (e.g., the Atmel SHA204) and performs data encryption based on that encryption key but may additionally or alternatively be any hardware module capable of encrypting transmissions from and/or decrypting transmissions to the bounty tracking device 102.

In some cases, a proxy device 108 and the bounty tracking devices 102 may communicate using frames. Frames can carry commands to control the connection, and/or data to communicate with a backend server/bounty management system 106. Bounty tracking devices 102 that are not actively communicating with another electronic device may be configured to enter a low power mode. In such cases, a wireless transceiver included in the bounty tracking device may be put into an unpowered standby (e.g., non-receiving) mode to save power with periodic intervals during which the wireless transceiver is powered to receive communications.

The bounty tracking device may include a housing that takes any suitable form. Ideally, the bounty tracking device 102 is a portable device that can be worn and prominently displayed to persons other than the one associated with the bounty tracking device. For example, the bounty tracking device 102 may be implemented as a lanyard or pin that can be worn by a person. In some cases, the bounty tracking device 102 may be implemented as a stackable token or chip. In some embodiments, the housing of the bounty tracking device 102 may take an ornamental form. For example, the housing may be designed to look similar to a poker chip or other gaming implementation.

A proxy device 108 may include any suitable electronic device configured to provide ingress/egress to the network 104 (e.g., a gateway). In some embodiments, the proxy device 108 enables communication between devices in the network 104 and devices outside the network 104 (e.g., via a second network). An example of proxy device 108 may include a router, routing switch, integrated access device, multiplexer, or any other suitable device.

In embodiments, each of the bounty tracking devices may initially be provisioned with information about a player to which the bounty management device is assigned as well as a bounty amount associated with that player in relation to a tournament or other gaming event. As players of the tournament are eliminated, a bounty amount (or a portion thereof) associated with the eliminated player is transferred from a first bounty tracking device 102(A) associated with that eliminated player to a second bounty tracking device 102(C) associated with the player that eliminated them. In some cases, the bounty amount may be transferred directly from the first bounty tracking device 102(A) to the second bounty tracking device 102(C) through a direct wireless connection established between the two bounty tracking devices 102. In some cases, the bounty amount may be transferred from the first bounty tracking device 102(A) to a proxy device 108 and then that bounty amount may be transferred from by the proxy device 108 to the second bounty tracking device 102(C). Additionally, the bounty tracking devices may transfer information other than a bounty amount (e.g., player information, audio data, etc.) between each other.

Upon receiving information about a bounty amount received from the first bounty tracking device 102(A), the second bounty tracking device 102(C) may be configured to generate a new bounty amount from both a current bounty amount stored on the second bounty tracking device 102(C) and the bounty amount received from the first bounty tracking device 102(A). In some cases, the new bounty amount may be a summation of the two bounty amounts. In some cases, the new bounty amount may be a summation of the old bounty amount on the second bounty tracking device 102(C) and a portion of the bounty amount from the first bounty tracking device 102(A). In such cases, the second bounty tracking device 102(C) may track a second portion (e.g., a remainder) of the bounty amount from the first bounty tracking device 102(A) to be reserved and assigned to the player associated with the second bounty tracking device 102(C).

In embodiments, information about a bounty amount (and other suitable information) stored by a bounty tracking device 102 may be output via one or more output components. For example, a bounty amount may be displayed on a display component 110 of the bounty tracking device 102. In another example, a light source on the bounty tracking device 102 may be altered based on the current bounty amount. In this example, a color of the light source may be changed to indicate a level or tier associated with the current bounty amount.

In embodiments, the bounty tracking device 102 of the disclosed system may be configured to perform various other functions as will be described elsewhere in this disclosure. By way of example, the bounty tracking device 102 may be configured to identify/interact with a group of other bounty tracking devices. In some cases, such groupings may be determined based on a relative proximity of the bounty tracking device to other bounty tracking devices (e.g., via a detected signal strength).

In various embodiments, the network 104 may include any wireless network, any wired network, or a combination thereof, configured to operatively couple the modules, devices, components, and/or systems as illustrated in FIG. 1. For example, the network 104 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AlN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VOLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
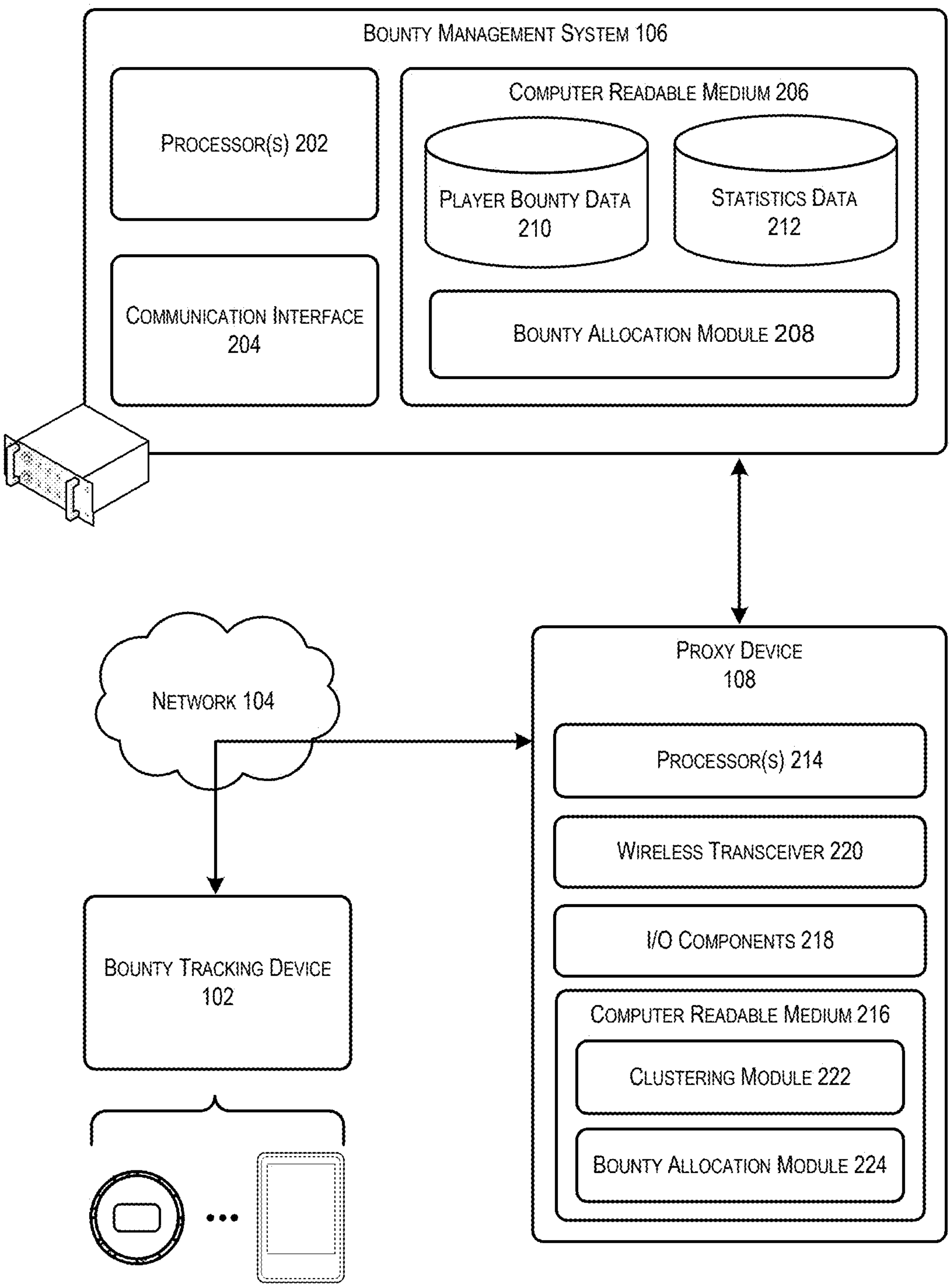
FIG. 2 depicts an example environment in which a system may be implemented to manage bounty data for use in gaming tournaments in accordance with embodiments.

FIG. 2 depicts an example environment in which a system may be implemented to manage bounty data for use in gaming tournaments in accordance with embodiments. As noted elsewhere, the system may include at least a bounty management system 106, at least one proxy device 108, and multiple bounty tracking devices 102 operating on a local wireless network 104. The bounty management system 106, proxy device 108, bounty tracking devices 102, and network 104 may be examples of the respective components as described in relation to FIG. 1 above.

The bounty management system 106 may be implemented on any electronic device configured to perform at least a portion of the functions described herein. As illustrated, the bounty management system 106 may include one or more hardware processors 202 configured to execute one or more stored instructions. In some cases, the processor(s) 202 may include one or more processing cores. Further, the bounty management system 106 may include one or more communication interfaces 204 configured to provide communications between the bounty management system 106 and other devices, such as the proxy device 108 or any other suitable electronic device.

The bounty management system 106 may also include computer-readable media 206 that stores various executable components (e.g., software-based components and/or firmware-based components, etc.). The computer-readable media 206 may store components to implement functionality described herein. While not illustrated, the computer-readable media 206 may store one or more operating systems utilized to control the operation of the one or more devices that comprise the bounty management system 106. According to one instance, the operating system comprises the LINUX operating system. According to another instance, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

The computer-readable media 206 may include portions, or components, that configure the bounty management system 106 to perform various operations described herein. For example, the computer-readable media 206 may include a component configured to allocate bounty data amongst a set of players (e.g., bounty allocation module 208). Additionally, the computer-readable media 206 may further maintain one or more databases, such as a database of information maintained in relation to player bounty data (e.g., player bounty data 210) and/or information indicating player eliminations/defeats (e.g., statistics data 212). Additionally, the computer-readable media 206 may include a master ledger that pairs player information and bounty information together. This ledger is a history of how all bounties throughout a tournament move between players as bounties are won and players are eliminated. Statistics data 212 may store an indication as to which other players a respective player has been eliminated by as well as which players that respective player has eliminated. Additionally, the statistics data 212 may store an indication as to a lifetime earnings/loss for each player. It should be noted that while player bounty data 210 and statistics data 212 are described as databases, any suitable data storage means may be used. For example, one or more of player bounty data 210 or statistics data 212 may be stored as a distributed blockchain ledger.

A bounty allocation module 208 may be configured to, when executed by the processors 202, reassign/allocate bounty amounts between players. Notably, when an indication is received (e.g., from proxy device 108) that one player has defeated/eliminated another, the bounty allocation module 208 may be configured to subtract a bounty amount (or at least a portion thereof) from an account or profile associated with a first player (e.g. a "defeated" player) and add that bounty amount (or portion thereof) to an account or profile associated with a second player (e.g. a "defeating" player) in the player bounty data 210. In some cases, the bounty allocation module 208 may be configured to update statistics data 212 to include information about which players have been defeated and which players have defeated others. In embodiments, the bounty allocation module 208 may be configured to generate/calculate a ranking or tier value to be associated with a player based on the number of other players that he or she has defeated.

In some embodiments, the bounty allocation module 208 may be configured to verify or authenticate bounty data received from a bounty tracking device 102 (e.g., via a proxy device 108). Notably, when a request is received to transfer a bounty amount from a first bounty tracking device to a second bounty tracking device, the bounty allocation module 208 may be configured to compare a unique identifier received in relation to that request against an expected identifier associated with the bounty tracking device. In some cases, such an identifier may be generated dynamically based on information provided to the bounty tracking device. For example, the bounty management system 106 and the bounty tracking device 102 may each securely store an authentication key associated with that bounty tracking device. In this example, when a request is generated to transfer or receive a bounty amount, that authentication key may be used (along with other information associated with the requested transaction or a challenge value) to generate a verification value. This verification value may be generated independently by both the bounty tracking device 102 and the bounty allocation module 208 and the transaction may be verified/authenticated only if the two independently generated verification values match. In some cases, the bounty allocation module 208 may be configured to compare a bounty amount associated with a requested transaction against a bounty amount associated with the bounty tracking device and may reject the requested transaction if the bounty amounts do not match (or in some cases, if the requested bounty amount is greater than the bounty amount associated with the request).

The network 104 may include any suitable local network of devices using wireless communication protocols. In some embodiments, such a network 104 may include any combination of Personal Area Networks (PANs), Local Area Networks (LANs), Campus Area Networks (CANs), Metropolitan Area Networks (MANs), or wide area network (WAN). Such a network 104 may include any short-range wireless communication networks (e.g., ZigBee, Bluetooth, etc.). In embodiments, the network 104 may be configured as a low-power (LP) version of a network type, such as a low power wide area network (LPWAN). The devices in the network 104 might operate in either synchronous or asynchronous mode.

As noted elsewhere, a proxy device 108 may include any electronic device that facilitates communication between the various components operating on the network 104. In embodiments, the proxy device 108 is a device configured to send real-time, or near real-time, data to one or more bounty tracking device 102. The proxy device 108 may include one or more processors 214 and a computer-readable media 216 that stores computer executable instructions for implementing at least a portion of the functionality described herein. Additionally, the proxy device 108 may include any number of input/output (I/O) components 218 capable of receiving user input and/or presenting output to a user.

As depicted, the proxy devices 108 may include a wireless transceiver 220. The wireless transceiver 220 may be configured to both transmit and receive communications between the proxy device 108 and another electronic device (e.g., bounty tracking device 102). The wireless transceiver 220 may be configured to enable communication with one or more electronic devices using any suitable wireless protocol. In some cases, the wireless transceiver is a Radio Frequency Identifier (RFID) reader capable of communicating with one or more bounty tracking device 102 using RFID protocols.

The computer-readable media 216 may include portions, or components, that configure the proxy device 108 to perform various operations described herein. For example, the computer-readable media 216 may include a component configured to identify clusters (or groups) of players (e.g., clustering module 222). In another example, the computer-readable media 216 may include a component configured to transfer bounty data or amounts between bounty tracking devices (e.g., bounty allocation module 224).

In embodiments, a clustering module 222 may be configured to, when executed by the processors 214, identify groups or clusters to which individual bounty tracking devices should be assigned. In some cases, such clusters may be representative of individual games being played within a tournament. For example, in a poker tournament, players participating in that tournament may play in one of multiple poker games held throughout a geographic region (e.g., a stadium, arena, gaming hall, etc.) associated with the tournament. In such cases, the clustering module 222 of the proxy device 108 may be configured to attempt to assign each bounty tracking device 102 to a particular cluster or grouping in order to aggregate statistics for the player associated with that bounty tracking device.

In some cases, a proxy device 108 may be positioned at a gaming station (e.g., a poker table) and the clustering module 222 may be configured to identify bounty tracking devices 102 to be assigned to a cluster associated with that gaming station based on a strength of a wireless signal associated with the bounty tracking device 102. For example, the clustering module 222 may assign an individual bounty tracking device 102 to a cluster associated with a gaming station if a strength of a wireless signal associated with that individual bounty tracking device is greater than a threshold level of strength.

In some cases, the clustering module 222 may be configured to assign a bounty tracking device 102 to a cluster upon receiving a notification from that bounty tracking device 102. For example, a bounty tracking device 102 may perform a discovery process to identify which proxy device 108 are in wireless communication range as well as a strength of a wireless signal associated with each identified proxy device 108. In these cases, the bounty tracking device 102 may transmit a notification to the proxy device 108 determined to have the strongest signal (assuming that it is the closest proxy device 108) and the clustering module 222 may be configured to assign that bounty tracking device 102 to a cluster associated with the proxy device 108.

In embodiments, a bounty allocation module 224 may be configured to, when executed by the processors 214, transfer a bounty amount associated with a first bounty tracking device to a second bounty tracking device. In order to do this, the proxy device 108 may first receive an indication of the bounty amount as stored locally on the first bounty tracking device. In embodiments, this indication is transmitted by the first bounty tracking device to the proxy device 108 over a wireless communication channel. Note that in some cases, the proxy device 108 may be configured to verify or authenticate the bounty amount and/or an identifier received from the first bounty tracking device via communication with the bounty allocation module 208 of the bounty management system 106. Once the bounty allocation module 224 has received the bounty amount from the first bounty tracking device (and verified/authenticated that amount), the bounty allocation module 224 may transmit the bounty amount to the second bounty tracking device via a second wireless communication channel.

By way of illustration, when a first player is eliminated from a tournament by a second player, a first bounty tracking device associated with the first player may be presented to the proxy device (e.g., via an RFID reader). In this illustrated example, the first bounty tracking device provides bounty information to the proxy device. In some cases, the information may include a unique identifier that can be used by the proxy device to determine a current bounty associated with the first bounty tracking device (e.g., via player bounty data 210 as maintained by a bounty management system 106). In some cases, the information may include the current bounty amount as stored in memory of the first bounty tracking device.

Continuing with the illustrated example above, the proxy device 108 may then receive an indication from a second bounty tracking device associated with the second player. The proxy device 108 may then provide bounty information to the second bounty tracking device. In some cases, the bounty information includes an indication of a bounty amount to be added to a current bounty maintained in local memory by the second bounty tracking device. In some cases, the bounty information includes an indication of a total current bounty to be associated with the second bounty tracking device to replace the current bounty amount stored by the second bounty tracking device.

In embodiments, the proxy device 108 is configured to send and/or receive periodic transmissions to and/or from one or more bounty tracking device 102. Each bounty tracking device 102 may operate in a low-power mode (during which a wireless transceiver is powered down) for some predetermined amount of time (e.g., a sleep interval). In some cases, the amount of time that each bounty tracking device 102 spends in the low-power mode may be a default amount of time as set by a manufacturer or distributor of the bounty tracking device 102. In some embodiments, the amount of time that each bounty tracking device 102 spends in the low-power mode may be determined by the proxy device 108. In these embodiments, the proxy device 108 may provide instructions to each bounty tracking device 102 to set a low-power mode interval of the length of time as determined by the proxy device 108. The proxy device 108 may be configured to identify the low-power mode intervals associated with each bounty tracking device 102 based on a determined status for a player associated with the bounty tracking device 102. For example, if a player is not actively involved in a game, or if the player has been eliminated, then the proxy device 108 may assign a longer low-power interval to the bounty tracking device associated with that player. However, if a player is actively involved in a game (or any activity that would require more frequent updates), then the proxy device 108 may assign a shorter low-power interval to the bounty tracking device associated with that player.

In embodiments in which the bounty management system 106 uses a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Figure 3:
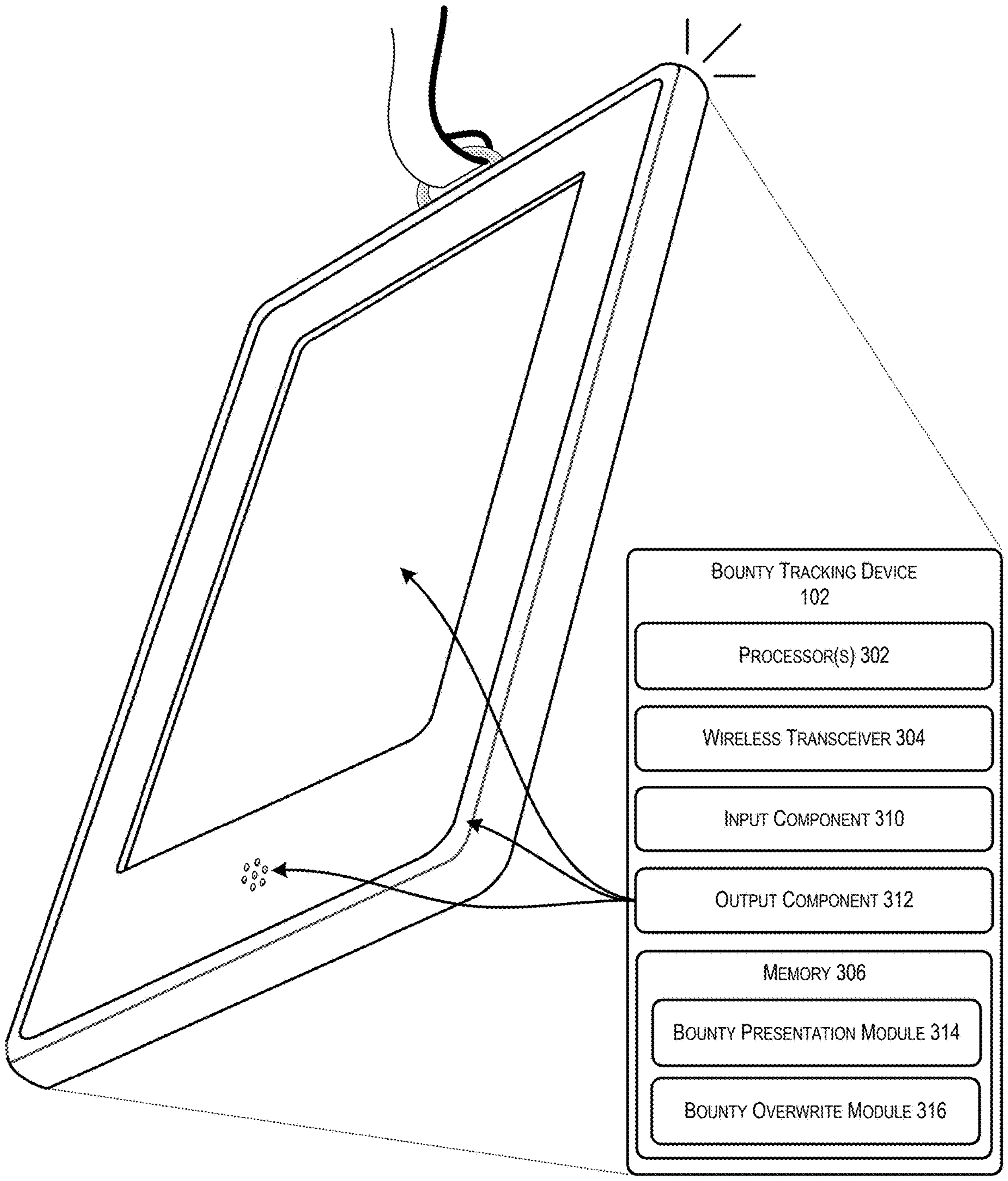
FIG. 3 depicts an example of a bounty tracking device that may be implemented in accordance with some embodiments.

FIG. 3 depicts an example of a bounty tracking device that may be implemented in accordance with some embodiments. The bounty tracking device 102 may be an example of the bounty tracking device 102 as described in relation to FIG. 1 above.

As illustrated, the bounty tracking device 102 may include one or more hardware processors 302 configured to execute one or more stored instructions. In some cases, the processor(s) 302 may include one or more processing cores. Further, the bounty tracking device 102 may include wireless transceiver 304 configured to enable communications between the bounty tracking device 102 and other devices, such as the proxy device 108 or any other suitable electronic device. The bounty tracking device 102 may also include a memory 306 that stores various executable components (e.g., software-based components and/or firmware-based components, etc.). The memory preferably includes firmware and/or software on an embedded MultiMediaCard (eMMC), but may additionally or alternatively store firmware and/or software in any suitable storage solution.

The memory 306 may store components to implement functionality described herein. While not illustrated, the memory 306 may store one or more operating systems utilized to control the operation of the bounty tracking device 102. In embodiments, the operating system may be a resource-efficient embedded operating system designed for the unique constraints of low-power devices. According to one instance, the operating system can include Linux-based systems like Embedded Linux and Ubuntu Core, RTOSs like FreeRTOS, and Microsoft's Windows IoT operating system. It should be appreciated that other operating systems can also be utilized.

The bounty tracking device 102 may further include (in some cases) one or more input component 310 capable of enabling a user to provide input to the bounty tracking device 102. Such an input component may include a button, switch, scrollwheel, or other suitable interactive component capable of allowing a user to provide input to the bounty tracking device 102. In some cases, a signal received from an input component 310 may be used to cause the bounty tracking device to change, or cycle through, information presented via one or more output component 312.

As depicted, the bounty tracking device 102 may include one or more output component 312. An output component 312 may be any suitable hardware component configured to present output to a user of the bounty tracking device. In some cases, an output component 312 may include a display screen capable of presenting visual output to a user. In some cases, an output component may include a speaker or other audio emitter capable of providing audio output to a user. In some cases, an output component may include a lighting element configured to present information to a user of the bounty tracking device. For example, a lighting element may be installed within the bounty tracking device behind a transparent or translucent housing component configured to disperse/distribute light that passes through it. In order to convey output information, the lighting element may be configured to change colors. For example, a lighting element may be configured to emit light across a range of wavelengths. In this example, the lighting element may be dynamically configured to emit a color of light that corresponds to a current bounty amount associated with the bounty tracking device.

By way of illustrating the above, a bounty tracking device may be encompassed by a translucent ring. In this illustrated example, a light emitting diode (LED) or other suitable lighting element may be positioned within a housing of the bounty tracking device behind the translucent ring, such that light emitted by the lighting element is dispersed throughout the translucent ring and visible to a user observing the bounty tracking device. Continuing with this example, a color of the light emitted by the LED may be altered as a current bounty amount stored by the bounty tracking device is changed, enabling a user observing the bounty tracking device to quickly assess a current bounty amount in relation to the whole field by an associated tier color.

The memory 306 may include portions, or components, that configure the bounty tracking device 102 to perform various operations described herein. For example, the memory 306 may include a component configured to present and/or provide bounty information (e.g., bounty presentation module 314) as well as a component configured to overwrite, or otherwise update, a current bounty amount maintained by the bounty tracking device 102. Additionally, the memory 306 may further maintain a local repository of stored values, such as a data repository that stores a current bounty value (e.g., bounty overwrite module 316).

A bounty presentation module 314 may be configured to, when executed by the processors 302 cause output to be presented by the one or more output component 312. In some cases, the bounty presentation module 314 may be configured to display a current bounty amount or other information (as maintained in memory 306) on a display screen (an example of an output component 312). In such cases, the bounty presentation module 314 may be configured to cycle the information presented on the display screen upon receiving an input from an input component 310. In some cases, the bounty presentation module 314 may be configured to cause a lighting element to begin/stop emitting light or to emit light of a particular wavelength/color.

As noted elsewhere, the bounty presentation module 314 may be configured to cause a lighting element of the bounty tracking device to provide output to a user observing the bounty tracking device. In some cases, the bounty presentation module 314 may be configured to determine a color or wavelength within a range of available colors/wavelengths of light to be emitted by the lighting element based on information stored by the bounty tracking device.

For example, a color emitted by the lighting element of a bounty tracking device may begin (e.g., at the beginning of a tournament) at a default color and each time that the player eliminates another player, the emitted color may shift or change. In such an example, the color of light may change by moving along a spectrum such that it begins at one end of a spectrum and ends at the other end of the spectrum (e.g., the emitted light may begin at green and end at red) once a certain number of players have been eliminated by the player possessing the bounty tracking device.

In another example, the bounty presentation module 314 may be configured to set a color of the light emitted by the lighting element to a color that represents a current bounty amount or a range into which the current bounty amount falls. In such an example, the lighting element may emit green light when the current bounty amount is $500 or less, yellow light when the current bounty is between $500 and $2000, orange light when the current bounty is between $2000 and $5000, and red light if the current bounty is above $5000.

In another example, the bounty presentation module 314 may be configured to set a color of the light emitted by the lighting element based on information provided by a bounty management system 106. For example, the bounty management system 106 may determine a color to which a lighting element of the bounty tracking device 102 should be set based on a relative position/status of the player associated with that bounty tracking device to other players. For example, if the player associated with the bounty tracking device 102 has the lowest current bounty level of the players playing in the same game, then the color of the lighting element may be set to green whereas if the player associated with the bounty tracking device 102 has the highest current bounty level of the players playing in the same game, then the color of the lighting element may be set to red. It should be noted that while an exemplary color schema is described, any suitable color schema may be used.

In some embodiments, the bounty presentation module 314 may be further configured to cause an audio output component 312 to produce/emit an audio output. In some cases, an audio clip may be played on a speaker (an exemplary audio output component 312) of the bounty tracking device 102 upon detecting that some event has occurred. For example, upon detecting that a player associated with the bounty tracking device 102 has eliminated another player, the bounty presentation module 314 may be configured to cause the speaker to output a victory audio clip whereas upon detecting that the player associated with the bounty tracking device 102 has been eliminated, the bounty presentation module 314 may be configured to cause the speaker to output a defeat audio clip. In some cases, the audio clip may be an audio clip that is stored locally in the memory 306. In other cases, the audio clip may be an audio clip that is transmitted to the bounty tracking device 102 via a proxy device 108. For example, upon detecting that a player has joined a game or table at a tournament, a bounty management system 106 may provide an audio clip associated with that player to a proxy device 108, which may then transmit that audio clip to each of the bounty tracking devices 102 currently associated with the game/table. In this example, a respective bounty presentation module 314 on each of the bounty tracking devices 102 may cause an output component 312 of the respective bounty tracking device to play that audio clip.

A bounty overwrite module 316 may be configured to, when executed by the processors 302 overwrite/update a current bounty amount maintained by the bounty tracking device 102. In some embodiments, the bounty overwrite module 316 may be configured to overwrite a first (e.g., current) bounty amount stored in memory 306 with a second bounty amount received from another device (e.g., a bounty management system via a proxy device).

In some embodiments, the bounty overwrite module 316 may be configured to generate a new bounty amount from a first (e.g., current) bounty amount and a second bounty amount received from another device (e.g., another bounty tracking device or a proxy device). In such embodiments, the bounty overwrite module 316 may be configured to determine/generate a new current bounty amount by aggregating the old current bounty amount and at least one second bounty amount received from the other device. In some cases, the entire second bounty amount is added to the old current bounty to generate the new current bounty. In other cases, some portion of the second bounty amount may be set aside as a prize or reward for the player associated with the bounty tracking device 102. In such cases, a portion of the second bounty amount may be added to the old current bounty amount to generate the new current bounty amount. Once the bounty overwrite module 316 has generated a new current bounty amount, it may override the old current bounty amount with that value.

In some embodiments, the bounty overwrite module 316 may be configured to remove or zero out a current bounty amount. For example, the bounty tracking device 102 may receive an indication from another device (e.g., proxy device 108) that a player associated with that bounty tracking device has been eliminated. In this example The bounty tracking device 102 may be configured for wireless communication with a proxy device 108, and in some implementations, other bounty tracking devices. Notably, a bounty tracking device 102 may be configured to periodically transmit a signal to the closest device (e.g., as determined based on signal strength) to indicate a current status of the bounty tracking device. This periodic transmission, which may be referred to as a heartbeat signal, may include information about the bounty tracking device (e.g., a current bounty amount, an identity of an owner of the bounty tracking device, etc.). In some cases, where a bounty tracking device 102 is not within transmission range of a proxy device, a transmission originating from the bounty tracking device 102 may be received by another bounty tracking device, which may then relay that transmission to a proxy device.

Figure 4:
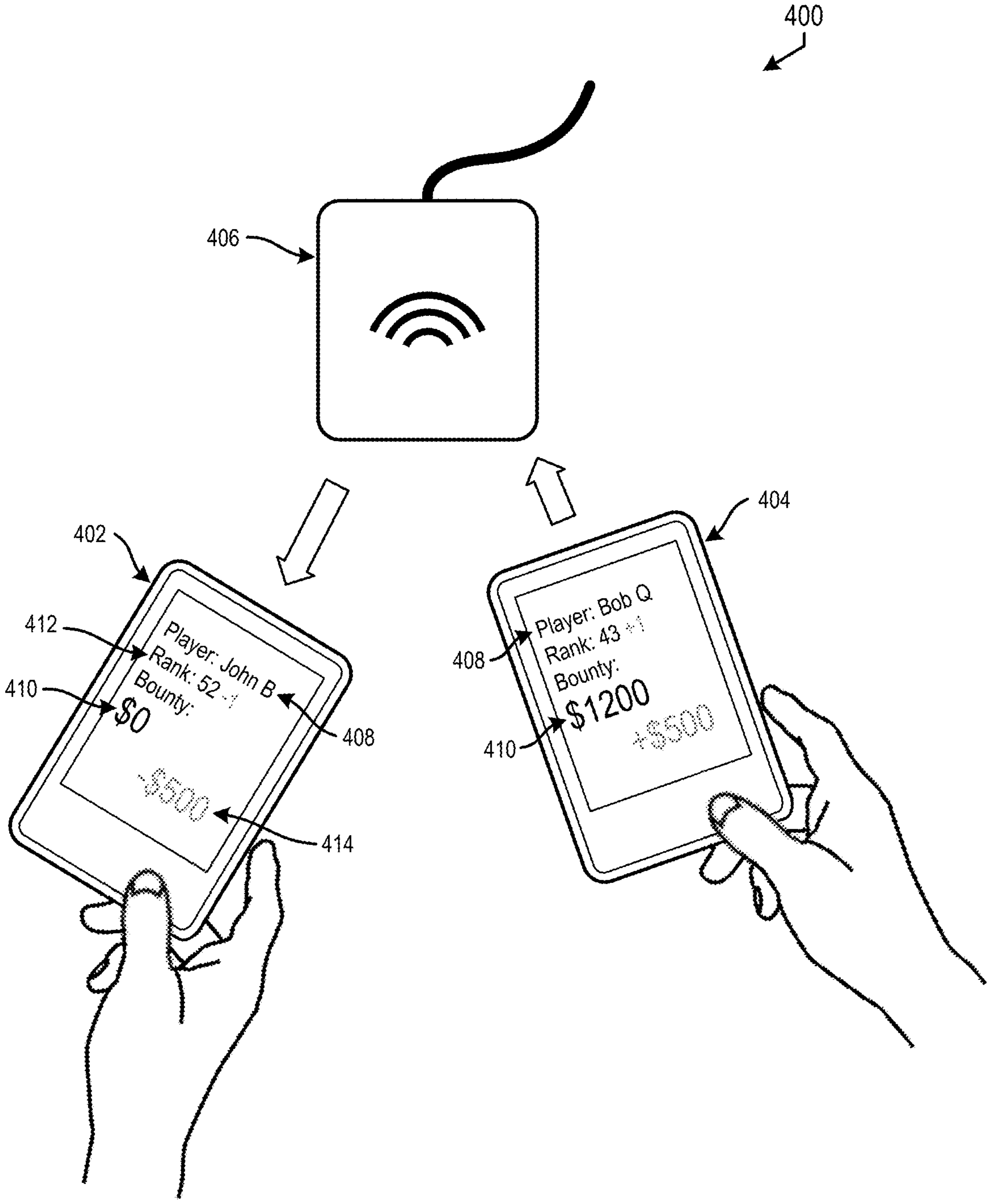
FIG. 4 depicts an exemplary process for transferring bounty data between multiple bounty tracking devices in accordance with some embodiments.

FIG. 4 depicts an exemplary process for transferring bounty data between multiple bounty tracking devices in accordance with some embodiments. In the process 400, bounty information may be transferred from a first bounty tracking device 402 to a second bounty tracking device 404. In the depicted example, this transference may be accomplished via communication with a proxy device 406.

As noted elsewhere, a bounty tracking device, such as the first bounty tracking device 402 and/or the second bounty tracking device 404, may include a display screen configured to display various information related to a bounty and/or a player associated with the respective bounty tracking device. For example, the display screen of a bounty tracking device may be configured to display an indication of a player identifier 408 (e.g., a player name or other identifier) and a current bounty amount 410 associated with the bounty tracking device. In some cases, the display screen may be configured to display other information, such as information about a ranking 412 or tier associated with the player or other suitable information. In some cases, the display screen may be configured to present information temporarily. For example, the display screen may be configured to present a value change 414 for a short period of time following a displayed value being altered or updated.

The first bounty tracking device 402 may be associated with, and in the possession of, a first player participating in a tournament. In embodiments, the bounty tracking device 402 may maintain, in a local memory (e.g., memory 306 as described in relation to FIG. 3 above), bounty information that includes one or more of a unique identifier attributed to the first bounty tracking device/player, a current bounty amount, an authentication key, or any other suitable information related to the first player and/or a respective bounty.

The second bounty tracking device 404 may be associated with, and in the possession of, a second player participating in the tournament. Similar to bounty tracking device 402, the bounty tracking device 404 may maintain, in a local memory, bounty information that includes one or more of a unique identifier attributed to the second bounty tracking device/player, a current bounty amount, an authentication key, or any other suitable information related to the second player and/or a respective bounty.

The proxy device 406 may be any suitable electronic device capable of wireless communication, but is preferably an RFID reader capable of short-range wireless communication with bounty tracking devices. As described elsewhere, the proxy device 406 may be in communication with a bounty management system (e.g., bounty management system 106). In some cases, the proxy device 406 may maintain a physical (e.g., wired) connection with a computing device on which the bounty management system is implemented.

In the process 400, during a game occurring within a tournament, the first player may be eliminated/defeated by the second player. In this example, the first player (e.g., the eliminated player) may present the bounty tracking device 402 to the proxy device 406 initially. The proxy device initiates a communication with the bounty tracking device 402 using the RFID protocol. In some cases, the proxy device 406 may provide a challenge value to the bounty tracking device 402 during this communication. A challenge value may be any data value that can be used in verification processes. For example, the challenge value may be a random or pseudorandom numeric value.

Upon communication being initiated between the proxy device 406 and the bounty tracking device 402, the bounty tracking device may be caused to provide bounty information to the proxy device 406. At a minimum, the bounty tracking device 402 may provide a unique identifier that can be used to identify the bounty tracking device 402 and/or the first player. In some cases, the bounty tracking device 402 may provide an indication of a current bounty value stored locally, as well as any other suitable information. In some cases, upon providing this information to the proxy device 406, the bounty tracking device 402 may be configured to zero out the current bounty amount in memory.

Additionally, the bounty tracking device 402 may be configured to generate a verification value based on the challenge value provided by the proxy device 406 and an authentication key stored by (and unique to) the bounty tracking device 402. In some cases, the verification value may be generated using a hash function or a cryptographic function. As described elsewhere, a bounty management system may independently generate a second verification value using the challenge value as conveyed by the proxy device 406 as well as the authentication key stored in relation to the bounty tracking device 402. In such cases, the transfer may be completed only if the bounty tracking device 402 is verified, as indicated by a match between the two independently generated verification values.

After the proxy device 406 has received bounty information from the first bounty tracking device 402, the second bounty tracking device 404 may be presented to the proxy device 406. The proxy device 406 then initiates a communication with the bounty tracking device 404 using the RFID protocol. In some cases, the proxy device 406 may provide a challenge value to the bounty tracking device 404 during this communication, which may be the same as the challenge value discussed above or a different value.

Upon communication being initiated between the proxy device 406 and the bounty tracking device 404, the bounty tracking device may be caused to provide bounty information to the proxy device 406. Similar to the above, the bounty tracking device 404 may provide a unique identifier that can be used to identify the bounty tracking device 404 and/or the second player. The bounty tracking device 404 may also generate and provide a verification value that can be used to authenticate the bounty tracking device 404 in a manner similar to that described above for bounty tracking device 402.

In some cases, the proxy device 406 may provide to the bounty tracking device 404 an indication of the current bounty value received from the bounty tracking device 402. In such cases, the bounty tracking device 404 may be configured to generate a new current bounty amount to be stored in memory of the bounty tracking device 404. Notably, the new current bounty value may be generated based on an aggregation of a current bounty value stored in memory and the current bounty value received from the bounty tracking device 402.

In some cases, the proxy device 406 may provide identifiers for both the bounty tracking device 402 and the bounty tracking device 404 to a bounty management system. In such cases, the bounty management system may complete a transfer of current bounty amounts from an account associated with the bounty tracking device 402 to the account associated with the bounty tracking device 404. The bounty management system, after generating an updated current bounty amount to be associated with the second player, may provide that updated current bounty amount to the proxy device 406 to be provided to the bounty tracking device 404. The bounty tracking device 404 then replaces a current bounty amount stored in memory with the updated current bounty amount.

In some embodiments, the bounty management system may maintain information about a player either in relation to a single tournament or across multiple tournaments. Notably, the bounty management system may maintain information collected during an enrollment process that can be used to identify individual players, such as a name, address, driver's license number, etc. In some cases, the bounty management system maintains an image of the player (that may be captured at the time of an enrollment) that can be used to identify/authenticate the player at tables/games running within the tournament. In some cases, the bounty management system tracks wins and losses for each player. Win/loss information for each player may include information about which other players the respective player has won against as well as which other players the respective player has lost to. In some cases, this information may be used to calculate a ranking (e.g., a national poker player ranking) to be assigned to the player. In some cases, this information may be used to identify potential incidents of cheating. For example, a large number of wins and/or losses to a particular other player (or a particular group of players) may be indicative that the player is part of a chip dumping scheme. The bounty management system may use any suitable algorithm or machine learning model to identify potential cheating from the player information.

Figure 5:
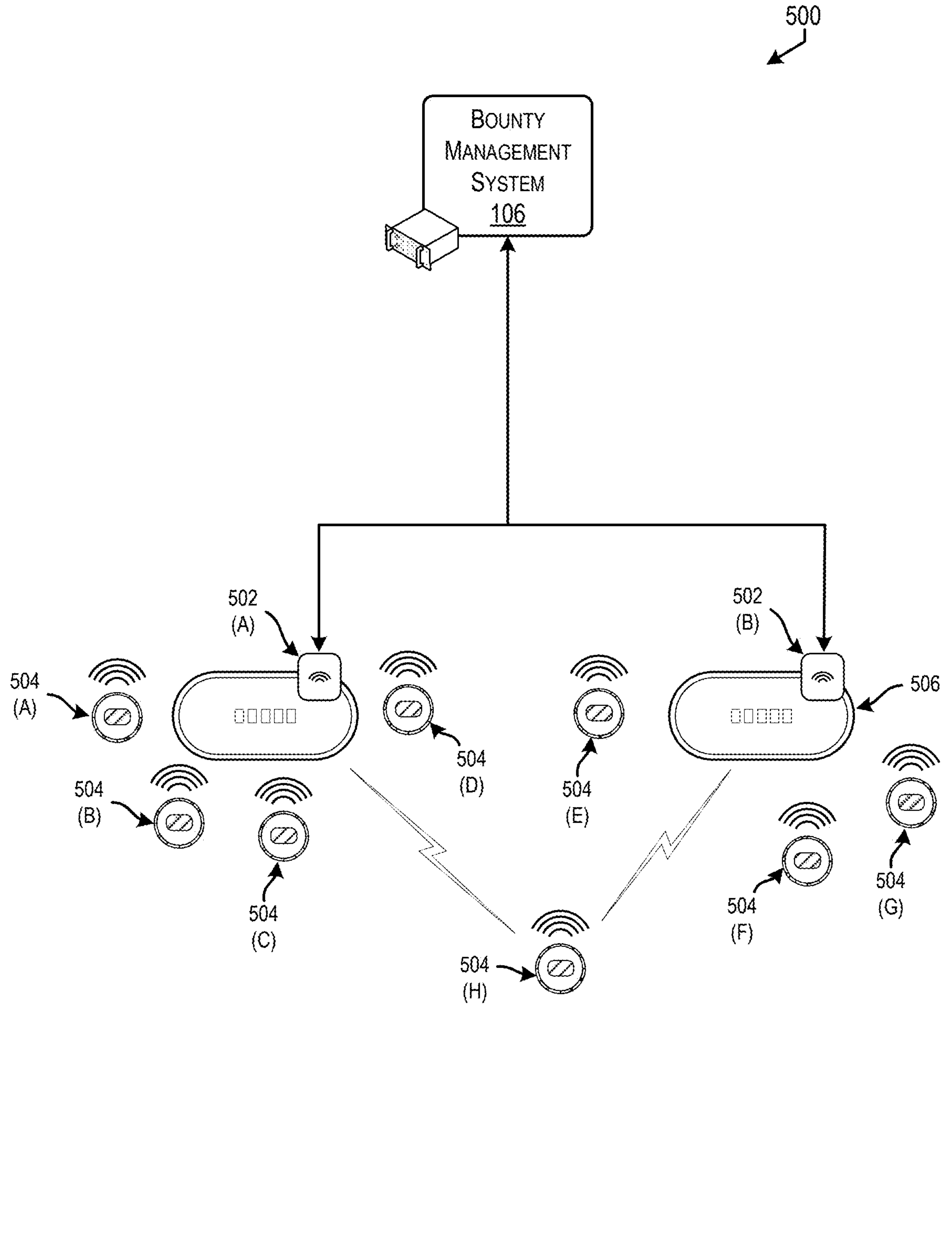
FIG. 5 depicts an exemplary environment in which clustering may be performed with respect to a number of bounty tracking devices in accordance with some embodiments.

FIG. 5 depicts an exemplary environment in which clustering may be performed with respect to a number of bounty tracking devices in accordance with some embodiments. As noted elsewhere, a proxy device 502 may be configured to automatically (e.g., without human interaction) identify a number of tracking devices 504 to be included in cluster or other suitable grouping. In some cases, the bounty management system 106 may be in communication with multiple proxy devices 502 (A and B). The bounty management system 106, proxy device 502, and bounty tracking device 504 may be examples of the respective bounty management system 106, proxy device 108, and bounty tracking device 102 as described in greater detail above.

As noted elsewhere, a tournament may involve multiple games being played within a geographic region. The multiple games may be played simultaneously or sequentially. In some cases, each proxy device 502 (A and B) may be associated with a game operating within a tournament and may be positioned at a respective table 506 associated with that game. Notably, the proxy device 502 may be positioned within reach of a dealer that is facilitating the game at the table.

Bounty tracking devices 504(A-H) may be clustered based on any suitable criteria. In some cases, the bounty tracking devices 504 may be clustered into groups by the bounty management system 106 that maintains information about which players are involved in a particular game. In some cases, the bounty tracking devices 504 may be clustered into groups by a proxy device 502 based on proximity. For example, in the depicted environment 500, bounty tracking devices 504(A-D) may be clustered and assigned to proxy device 502(A) whereas bounty tracking devices 504 (E-G) may be clustered and assigned to proxy device 502(B) based on a proximity between the respective proxy device and bounty tracking device. Notably, a proximity determination may be made in some cases by the respective proxy device 502 and in other cases by the respective bounty tracking device 504.

In one example, the proxy device 502 may assign bounty tracking devices 504 to a respective cluster if a signal strength detected in relation to that bounty tracking device is greater than a threshold signal strength level. In another example, a bounty tracking device 504 may transmit a notification to the proxy device determined to have the strongest signal strength. It should be noted that such a notification may be transmitted at periodic intervals (e.g., as a "heartbeat" notification) or such a notification may be transmitted upon detecting that the proxy device having the strongest signal strength has changed. In this example, the proxy device 502 may, upon receiving such a notification, add the bounty tracking device 504 to a cluster that it manages. In yet another example, each bounty tracking device 504 may be added manually by a dealer, tournament director, or other member of the tournament management staff. Notably, the user may approach the table 506 and his or her bounty tracking device 504 may be scanned (e.g., via an RFID reader) by the proxy device 502. Once scanned, the proxy device 502 may add the bounty tracking device 504 to a cluster that it manages.

It should be noted that the bounty tracking device 504 may not provide any notification to the proxy device that manages the cluster that it is leaving. Instead, when a proxy device 502 receives a notification to add a bounty tracking device to its cluster, it may communicate that addition to the bounty management system 106, which may then cause all other proxy devices 502 to remove the respective bounty tracking device 504 from their respective clusters where appropriate.

In some embodiments, one or more bounty tracking devices 504 operating within a cluster may be caused to perform a function. For example, each time that a player is eliminated from the game taking place at the table 506, each of the bounty tracking devices 504(E-G) may be caused to play an audio clip on its speaker. In some cases, the audio clip might be a defeat audio clip associated with the eliminated player. In some cases, the audio clip might be a victory audio clip associated with the eliminating player. In this example, the audio clip to be played may be provided to the proxy device 502(B) either by one of the bounty tracking devices 504 in its cluster or by the bounty management system 106. The proxy device 502(B) may then transmit the audio clip to each of the bounty tracking devices 504(E-G) to be played.

In another example, a lighting element associated with each of the bounty tracking devices 504(A-D) in a cluster may be altered based on a detected relative status. By way of illustration, the proxy device 502(A) may make a determination of an order of the players associated with the cluster based on criteria such as highest bounty, chip count, ranking, etc. In this illustration, the proxy device 502(A) (or the bounty management system 106) may assign a color to each of the bounty tracking devices 504(A-D) based on their relative position in relation to the relevant criteria. The proxy device 502(A) may then transmit instructions to each of the bounty tracking devices 504(A-D) to cause them to emit light in their respective colors. It should be noted that as the status of each bounty tracking devices 504(A-D) changes with respect to the relevant criteria, the proxy device 502(A) may cause the light emitted by the respective bounty tracking devices 504(A-D) to change accordingly.

In some embodiments, only a single bounty tracking device may be caused to perform a function. For example, a bounty tracking device associated with a player having the highest bounty amount at a particular table may emit light of a particular color whereas other bounty tracking devices at that table may be caused to emit light of a different (e.g., default) color.

In some cases, a proxy device 502 may communicate wireless instructions only to the bounty tracking devices 504 included in a cluster that it manages. For example, a bounty tracking device 504 may initially be added to a cluster associated with a proxy device 502 by being scanned via an RFID reader. In this example, once the proxy device 502 has added that bounty tracking device to its cluster, it may subsequently communicate with that bounty tracking device 504 using Bluetooth wireless communications. In such cases, the proxy device 502 may provide/receive information (e.g., handshake information) over the RFID communication that is then used to establish a communication session between the proxy device and the bounty tracking device using the Bluetooth protocol.

By way of illustration, consider the following exemplary scenario. Players having bounty tracking devices 504(A-D) are playing at a table associated with proxy device 502(A) and players having bounty tracking devices 504(E-G) are playing at a table associated with proxy device 502(B). In this scenario, a new player having bounty tracking device 504(H) approaches the two tables. As the new player approaches the two tables, the bounty tracking device 504 (H) may periodically perform a device discovery service.

When the bounty tracking device 504(H) enters the detection/transmission range of proxy devices 502 (A and B), the bounty tracking device 504(H) may make a determination about which of those proxy devices is closest based on a detected signal strength. Upon detecting that proxy device 502(B) has the strongest signal strength (of the two detected signals), the bounty tracking device 504(H) transmits a notification to the proxy device 502(B), which subsequently adds the bounty tracking device 504(H) to its cluster. Notably, in some cases, the bounty tracking device 504(H) only transmits such a notification upon detecting that the signal strength is above a threshold signal strength, indicating that the bounty tracking device 504(H) is actually situated at the table 506.

Alternatively, the new player may approach table 506 and present the bounty tracking device 504(H) to a dealer or other user, who may then scan the bounty tracking device 504(H) by a reader (e.g., an RFID reader) of the proxy device 502(B), which subsequently adds the bounty tracking device 504(H) to its cluster.

In some embodiments, where a player is assigned to a particular table, the bounty management system may (e.g., during an enrollment process) provision information about a proxy device associated with the assigned table onto the bounty tracking device 504 associated with that player. In such cases, the bounty tracking device 504 may be configured to communicate with the respective proxy device using the information provisioned onto it. When the bounty tracking device 504 comes within wireless communication range of that proxy device 502, the bounty tracking device 504 may be configured to provide a notification to the proxy device indicating its presence. In some cases, the proxy device 502 may receive information about each of the players assigned to its respective table 506. In such cases, the proxy device 502 may output a notification that all players are present once each of the players assigned to that table have arrived. In some cases, the bounty tracking device 504 may be configured to communicate only with the proxy device 502 to which it is assigned. In other cases, the bounty tracking device 504 may communicate with other proxy devices 502, but may be configured to activate certain features only in response to communications received from the proxy device 502 to which it is assigned.

Once the bounty tracking device 504(H) has been added to the cluster associated with proxy device 502(B) (which previously included only bounty tracking devices 504(E-G)), the cluster is updated to include bounty tracking devices 504(E-H). Notably, a few functions may be performed when this happens. In some cases, an audio clip associated with the new player (e.g., an entrance audio clip) may be caused to be played by one or more of the bounty tracking devices 504(E-H). In some cases, an ordering is determined for the bounty tracking devices 504(E-H) based on a predetermined criteria and the proxy device 502(B) may provide instructions to cause the bounty tracking devices 504(E-H) to present/update information based on that ordering.

Figure 6:
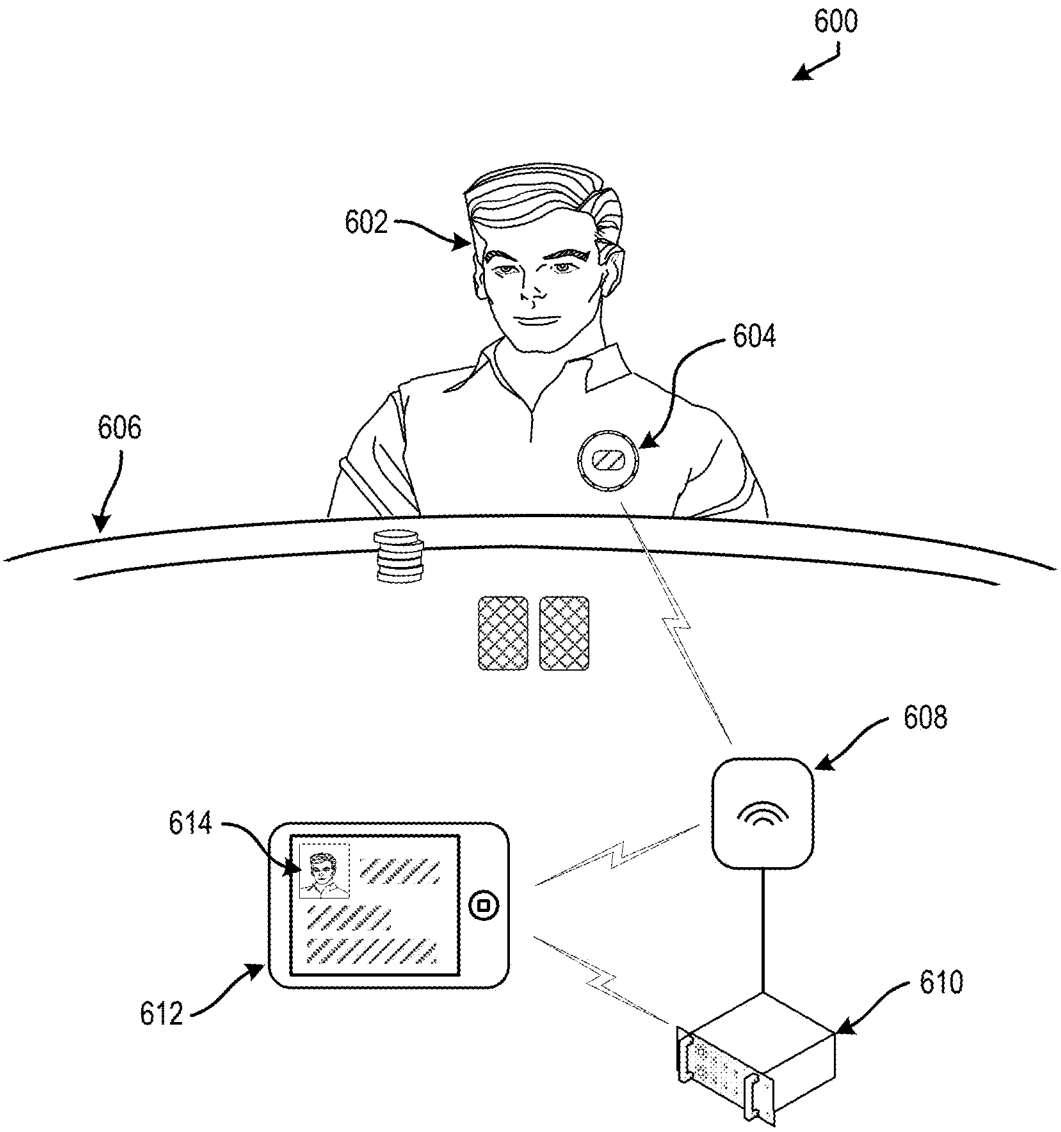
FIG. 6 depicts an exemplary bounty tracking device in operation in accordance with some embodiments.

FIG. 6 depicts an exemplary bounty tracking device in operation in accordance with some embodiments. In the depicted example, a player 602 is in possession of a bounty tracking device 604 while seated at a gaming table 606. The table 606 may have a proxy device 608 positioned on or nearby it. The proxy device 608 may be in further communication with a computing device on which a bounty management system 610 is implemented. In some embodiments, an administrator device 612 may be in communication (either wired or wireless) with the proxy device 608 and/or the bounty management system 610.

In some embodiments, the bounty tracking device 604 is a wearable device, such as a pin or lanyard, that when properly worn, is configured to display information about the player to other users that may observe that bounty tracking device. As noted elsewhere, information may be presented on a display of the bounty tracking device 604. In some cases, information may be presented via a lighting element of the bounty tracking device. For example, as described in greater detail elsewhere, a color or intensity of light emitted by the lighting element may convey information about the player, such as a current bounty level or ranking. In some cases, the bounty tracking device may be configured to present audio information via a speaker.

When the player 602 is enrolled in the tournament, the bounty tracking device 604 may be associated with that player and an initial bounty amount may be assigned to that player. Notably, the player may be asked to pay an amount of currency that corresponds to the bounty amount. In some cases, the bounty amount may be a default bounty amount assigned to each player enrolled in the tournament or each player of his or her rank enrolled in the tournament. In some cases, the bounty amount may be set by the player 602 by providing a corresponding amount of currency. Hence, the bounty amount initially associated with the player 602 may be the same as, or different from, a bounty amount associated with other players participating in the tournament. Once a bounty amount has been assigned to the player, an indication of that bounty amount is provisioned onto the bounty tracking device 604.

In embodiments, the bounty management system 610 may maintain information about each player enrolled in a tournament in relation to an account maintained on behalf of the respective player. The information may be stored temporarily (e.g., for a single tournament) or may be maintained across multiple tournaments. In some cases, the information may be stored in a national, or international, database. Such information may include any combination of biographic data (name, age, occupation, etc.), game-related data (e.g., current ranking, past player eliminations, lifetime earnings/spend, etc.), and/or identifying information (e.g., driver's license number, social security number, physical description, etc.). In some cases, the bounty management system 610 maintains an image of the player 602 that can be used for manual verification of the player 602.

After enrollment, the player 602 may proceed to the table 606. In some cases, the tournament may be an open tournament in which the player is provided a choice in which table/game to participate in. In some cases, the player may be assigned the table 606, such as by an administrator or by the bounty management system 610.

Once at the table, a proxy device 608 associated with the table 606 may be caused to add the bounty tracking device 604 to a cluster (e.g., game) associated with that table 606. In some cases, the player 602 may present his or her bounty tracking device 604 to be scanned/read by the proxy device 608 using an initial communication channel that operates using a short-range communication protocol. During a communication between the proxy device 608 and the bounty tracking device 604 over this initial communication channel, a second communication channel may be configured between the two devise that uses a second communication protocol and further communications between the two devices are transmitted/received over that second communication channel.

By way of illustrating the above, consider a scenario in which the player 602 approaches the table 606 and presents the bounty tracking device 604 to a dealer or other administrator. In this scenario, the bounty tracking device 604 and the proxy device 608 may not initially be configured to communicate using a Bluetooth protocol. The dealer places the bounty tracking device 604 within proximity (e.g., within RFID transmission range) of an RFID reader included on the proxy device 608. The RFID reader of the proxy device 608 may then transmit a notification to the bounty tracking device 604 to establish an initial communication session between the two devices.

Continuing with the above scenario, the bounty tracking device 604 may provide information to the proxy device over the initial communication session that can be used to verify/authenticate the bounty tracking device 604. In some cases, the proxy device 608 may provide a challenge to the bounty tracking device that includes a challenge value (e.g., a random or pseudorandom value). In these cases, the bounty tracking device 604 may be caused to generate a first verification value using the challenge value and an authentication key stored in memory by the bounty tracking device 604. Note that the authentication key may be unique to the bounty tracking device 604/player 602 or it may be used for each bounty tracking device associated with a tournament. The bounty tracking device 604 may then provide the generated first verification value to the proxy device 608 in order to be authenticated. Such authentication may be performed by independently generating a second verification value (either by the proxy device 608 or the bounty management system 610) and comparing the first and second verification values.

In some cases, authentication/verification of a bounty tracking device 604 may be performed by an administrator or other user. For example, once the bounty tracking device 604 is presented to the proxy device 608, information about the player 602 and/or the bounty tracking device 604 may be presented on a display of an administrator device 612. For example, the bounty management system 610 may provide an image 614 stored in relation to the player 602, such as from an account maintained in relation to the player, to the administrator device 612. In this example, the image 614 may be displayed on a display screen of the administrator device 612, allowing its user to physically verify the identity of the player 602. A user/operator of the administrator device 612 may then provide an indication that the player is authenticated. For example, a request for authentication may be presented on the administrator device 612 and the user of that device may then check a physical identification card for the player 602 to verify his identity. The user of the administrator device 612 may then submit an indication that the player 602 has been authenticated.

The proxy device 608 may provision information onto the bounty tracking device 604 that can be used to facilitate future communications over a second communication channel that uses a Bluetooth communication protocol. In some cases, the proxy device 608 provides an encryption key to the bounty tracking device 604 that can be used in encrypting/decrypting future communications. In some cases, the proxy device 608 may provide credentials that can be used to communicate with the proxy device 608.

In the above exemplary scenario, once the information has been provided to the bounty tracking device 604 by the proxy device 608, the bounty tracking device 604 may be moved out of range of the RFID reader and a second communication session is established between the proxy device 608 and the bounty tracking device 604 that uses a Bluetooth communication protocol. Further communications between the bounty tracking device 604 and the proxy device 608 may be transmitted over that second communication session. It should be noted that if the player leaves the table 606 and moves to a new table, that player may present the bounty tracking device 604 to a new proxy device associated with that new table. In that case, when the bounty tracking device 604 establishes communication with (e.g., is presented to an RFID reader of) the new proxy device, that new proxy device may provide a notification to the bounty management system 610. Upon receiving such a notification, the bounty management system 610 may cause the proxy device 108 to sever its communication session with the bounty tracking device 604.

In some cases, when a player is added to, or removed from, a cluster in this manner, proxy device 608 may transmit instructions to each of the bounty tracking devices included in the cluster to cause them to play an audio clip associated with that player. For example, when the bounty tracking device 604 is added to a cluster associated with proxy device 608, an entrance audio clip associated with player 602 may be caused to be played by each of the other bounty tracking devices included within that cluster. In some cases, such an audio clip is provided to the proxy device 608 by the bounty tracking device 604 to be transmitted to the other bounty tracking devices. In other cases, such an audio clip is provided to the proxy device 608 by the bounty management system 610, which maintains audio clips in association with players.

In an alternative scenario, the player 602 may be assigned to table 606 (e.g., by an administrator or by the bounty management system 610). In such a scenario, information that can be used to establish a communication session between the bounty tracking device 604 and the proxy device 608 may be provisioned onto the bounty tracking device 604 by the bounty management system 610. As noted above, such information may include an encryption key that can be used in encrypting/decrypting future communications and/or credentials that can be used to communicate with the proxy device 608. In such cases, the bounty tracking device 604 may establish a communication session between itself and the proxy device 608 once it is brought within wireless communication range.

In embodiments, the proxy device 608 may dynamically transmit information associated with its cluster to each bounty tracking device associated with that cluster. For example, as a status for one or more player (e.g., ranking, inclusion, bounty amount, etc.) changes, the proxy device 608 may be configured to generate and transmit updates to one or more bounty tracking devices. For example, in some cases a list of players may be maintained that is ordered by bounty amount. Upon detecting that a bounty amount for one or more player has been updated, the ordered list may be regenerated based on the new bounty amounts and information may be provided to the bounty tracking devices based on a new ordered list.

By way of illustration, each of the bounty tracking devices associated with a cluster may be configured to emit a light of a color that is representative of a bounty amount for that bounty tracking device relative to the other bounty tracking devices. In such cases, a first bounty tracking device associated with the highest bounty amount may emit light of a particular color (e.g., red). Upon detecting that a second bounty tracking device now has a higher bounty amount than the first bounty tracking device, the proxy device 608 may provide information to the first and second bounty tracking devices to cause the second bounty tracking device to change the color of light that it emits to red and to cause the first bounty tracking device to change the color of light that it emits to a different color.

In embodiments, while a player 602 is playing at the table 606, he may be eliminated from the tournament or he may eliminate another player from the tournament. As noted elsewhere, when an elimination occurs, a bounty amount associated with the eliminated player is transferred to the eliminating player. It should be noted that in some cases, a player may be eliminated by multiple other players rather than a single other player. In such cases, a portion of the bounty amount may be transferred to each of the eliminating players.

In some embodiments, the dealer places the bounty tracking device for the eliminated player within proximity (e.g., within RFID transmission range) of an RFID reader included on the proxy device 608. That bounty tracking device then conveys information that can be used to identify it and/or its bounty amount to the proxy device 608. The dealer then places the bounty tracking device for the eliminating player within proximity of the RFID reader included on the proxy device 608. The proxy device 608 then provides the information about the eliminated player, including at least the bounty amount, to the bounty tracking device for the eliminating player. A bounty amount currently stored by the bounty tracking device for the eliminating player is then updated based on a previous bounty amount and the transferred bounty amount.

In some embodiments, bounty amounts are transferred between bounty tracking devices using an administrator device 612. For example, a user of the administrator device 612 may provide input to the administrator device 612 that a first player has been eliminated by a second player. In some cases, the indication may be provided to the bounty management system 610, which may then transfer bounty amount from an account maintained in relation to the first player to an account maintained in relation to the second player. The bounty management system 610 may then provide instructions to the proxy device 608 to cause it to update bounty information stored by each of the bounty tracking device associated with the first player and the bounty tracking device associated with the second player. In alternative cases, the indication may be provided to the proxy device 608 and the proxy device may obtain bounty information from the bounty tracking device associated with the first player and provide it to the bounty tracking device associated with the second player.

Figure 7:
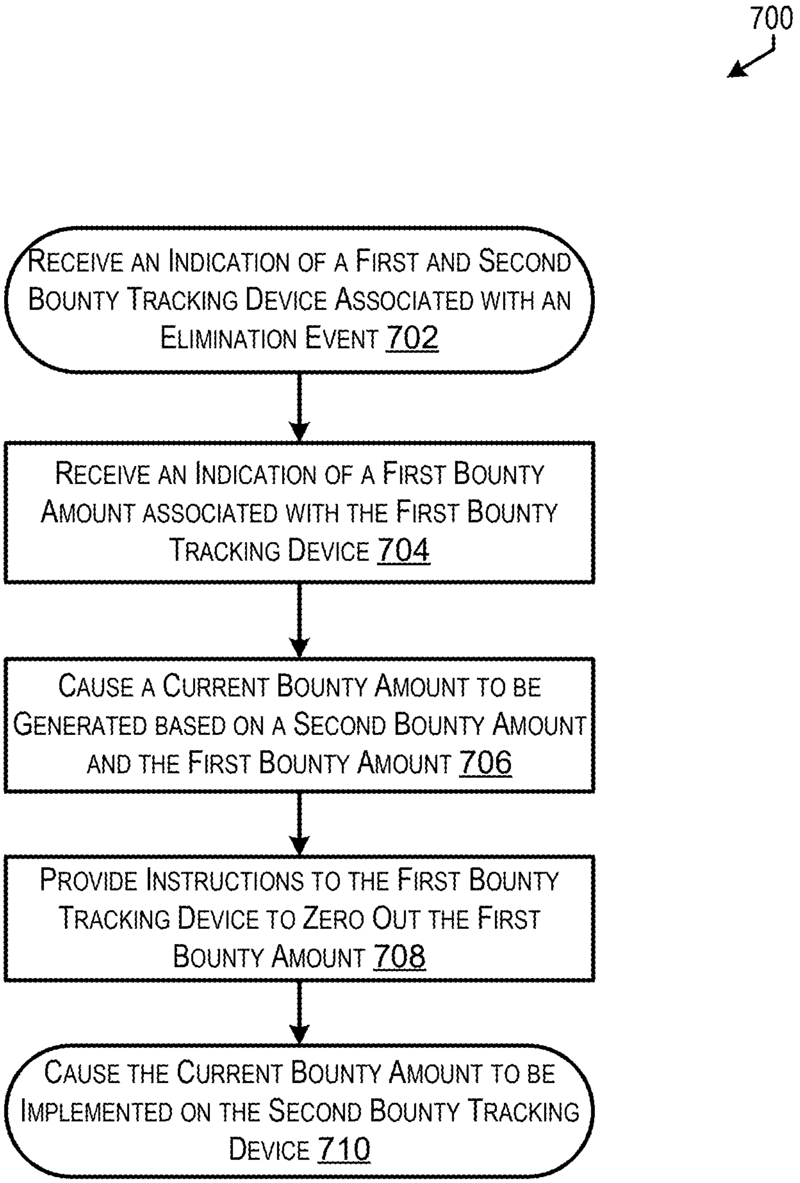
FIG. 7 depicts a flow diagram illustrating a first process for managing bounty information in a bounty management system in accordance with at least some embodiments.

FIG. 7 depicts a flow diagram illustrating a first process for managing bounty information in a bounty management system in accordance with at least some embodiments. While the process 700 (or any process as described herein) is depicted as a series of blocks, it should be noted that the steps described in relation to process 700 may be performed in any suitable order. The process 700 may be performed as a method by a proxy device, such as the proxy device 108 as described in relation to FIG. 1 and FIG. 2 above. The proxy device may be a gateway device that manages access to a wireless network on which multiple bounty tracking devices are operating.

At 702, the process 700 may involve receiving an indication of a first bounty tracking device and a second bounty tracking device associated with an elimination event. In embodiments, the indication of the first bounty tracking device and the second bounty tracking device may be received via a Radio Frequency Identifier (RFID) reader in communication with the proxy device.

At 704, the process 700 may involve receiving an indication of a first bounty amount associated with the first bounty tracking device. In some embodiments, the indication of the first bounty amount may be received from the first bounty tracking device. In other embodiments, the indication of the first bounty amount may be received a bounty management system in communication with the proxy device.

At 706, the process 700 may involve causing a current bounty amount to be generated based on a second bounty amount associated with the second bounty tracking device and the first bounty amount. In some embodiments, the current bounty amount is generated by a bounty management system in communication with the proxy device. In other embodiments, the current bounty amount is generated by the second bounty tracking device.

At 708, the process 700 may involve providing instructions to the first bounty tracking device to cause it to zero out the first bounty amount in a first local memory. In embodiments, these instructions may be provided to the first bounty tracking device when the indication of the first bounty tracking device is received and the elimination event is detected.

At 710, the process 700 may involve providing instructions to the second bounty tracking device to cause it to store the current bounty amount in a second local memory, wherein the second bounty tracking device is configured to present an indication of the current bounty amount.

In some embodiments, the process 700 may further involve performing an authentication of at least one of the first bounty tracking device or the second bounty tracking device. In such embodiments, performing an authentication of the first bounty tracking device may involve receiving a first verification value from the first bounty tracking device, and comparing the first verification value against an independently generated second verification value, wherein the first bounty tracking device is authenticated if the first verification value matches the second verification value. The proxy device may provide a challenge value to the first bounty tracking device and the first verification value may be generated based at least in part on the first verification value.

Figure 8:
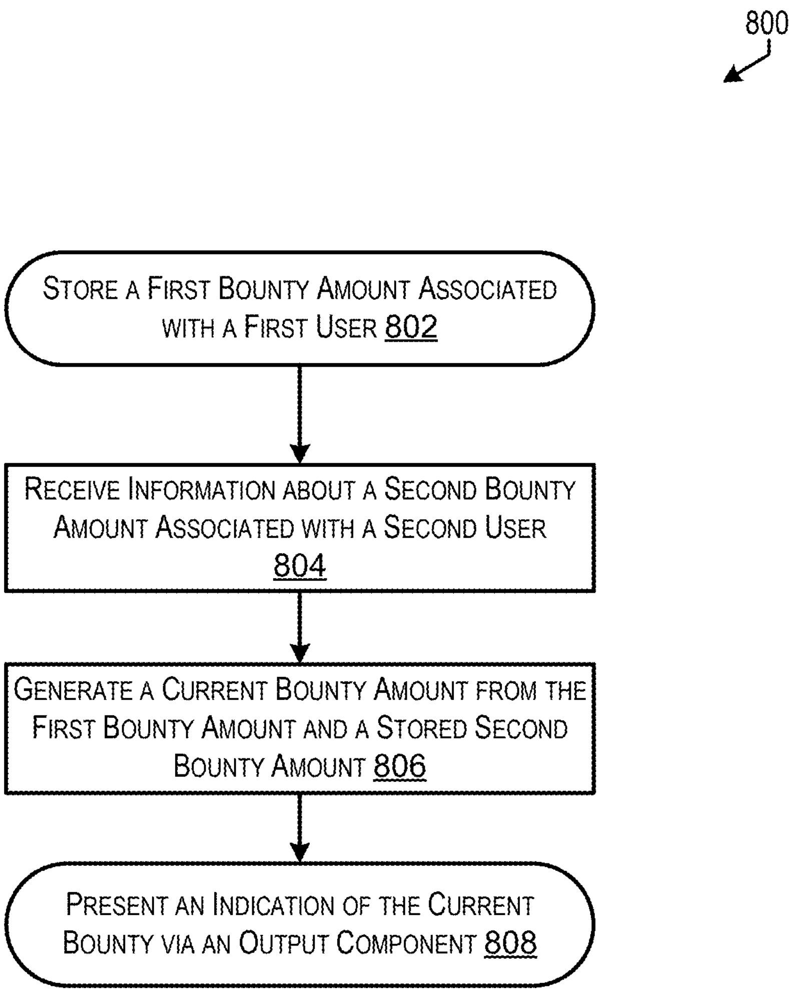
FIG. 8 depicts a flow diagram illustrating a second process for managing bounty information in a bounty management system in accordance with at least some embodiments.

FIG. 8 depicts a flow diagram illustrating a second process for managing bounty information in a bounty management system in accordance with at least some embodiments. The process 800 may be performed as a method by a bounty tracking device, such as the bounty tracking device 102 as described in relation to FIG. 1 and FIG. 2 above.

At 802, the process 800 may involve storing, in a local bounty data store, a first bounty amount associated with a first user. In some embodiments, the first bounty amount may be received from a bounty management system. The first bounty amount may correspond to an amount of currency paid by an operator of the bounty tracking device in relation to a tournament. It should be noted that a bounty is typically separate from the prize pool that is allocated to players based on what position they finish a tournament in. A buy-in in a bounty tournament is allocated by the tournament structure between prize pool and bounty prize pool funds. Chips are used to track a player's progress within a tournament, the bounty represents an amount to be won by a player that eliminates the operator of the bounty tracking device.

At 804, the process 800 may involve receiving, via a wireless transceiver, information about a second bounty amount associated with a second user. In some cases, the information about the second bounty amount further includes information about the second user (e.g., player name, elimination count, etc.). In some cases, the process 800 may further involve updating elimination data maintained by the bounty tracking device based on the information about the second user.

At 806, the process 800 may involve generating, based on the first bounty amount and the second bounty amount, a current bounty amount. In some embodiments, the current bounty amount is generated to include only a first portion of the second bounty amount and a remaining portion of the second bounty amount is stored separately. In such cases, the remaining portion of the second bounty amount may be representative of an amount that can be claimed by an operator of the bounty tracking device after his/her elimination. Upon generating the current bounty amount, the bounty tracking device may overwrite the first bounty amount in the local memory with the generated current bounty amount.

At 808, the process 800 may involve presenting an indication of the current bounty amount via the one or more output component. In some embodiments, the one or more output component includes a display screen configured to display the current bounty amount. In some embodiments, the one or more output component includes a light source. In these embodiments, the operations may further involve altering a color of the light source to indicate the current bounty amount. In such cases, the color of the light source may be selected based on a range of values within which the current bounty amount falls. In embodiments, the one or more output component may include a speaker. In such cases the operations may further involve causing the speaker to play an audio clip upon receiving the information about the second bounty amount. In some cases, the audio clip may be stored in the one or more computer readable memory in association with the user. In other cases, the audio clip may be received along with the information about the second bounty amount.

In some cases, the process 800 may further involve transferring the current bounty amount to yet another bounty tracking device upon the player associated with the bounty tracking device being eliminated. In such cases, the process 800 may involve transmitting, via the wireless transceiver, the current bounty to at least one second electronic device, and setting the value stored in the local bounty data store to zero.

Figure 9:
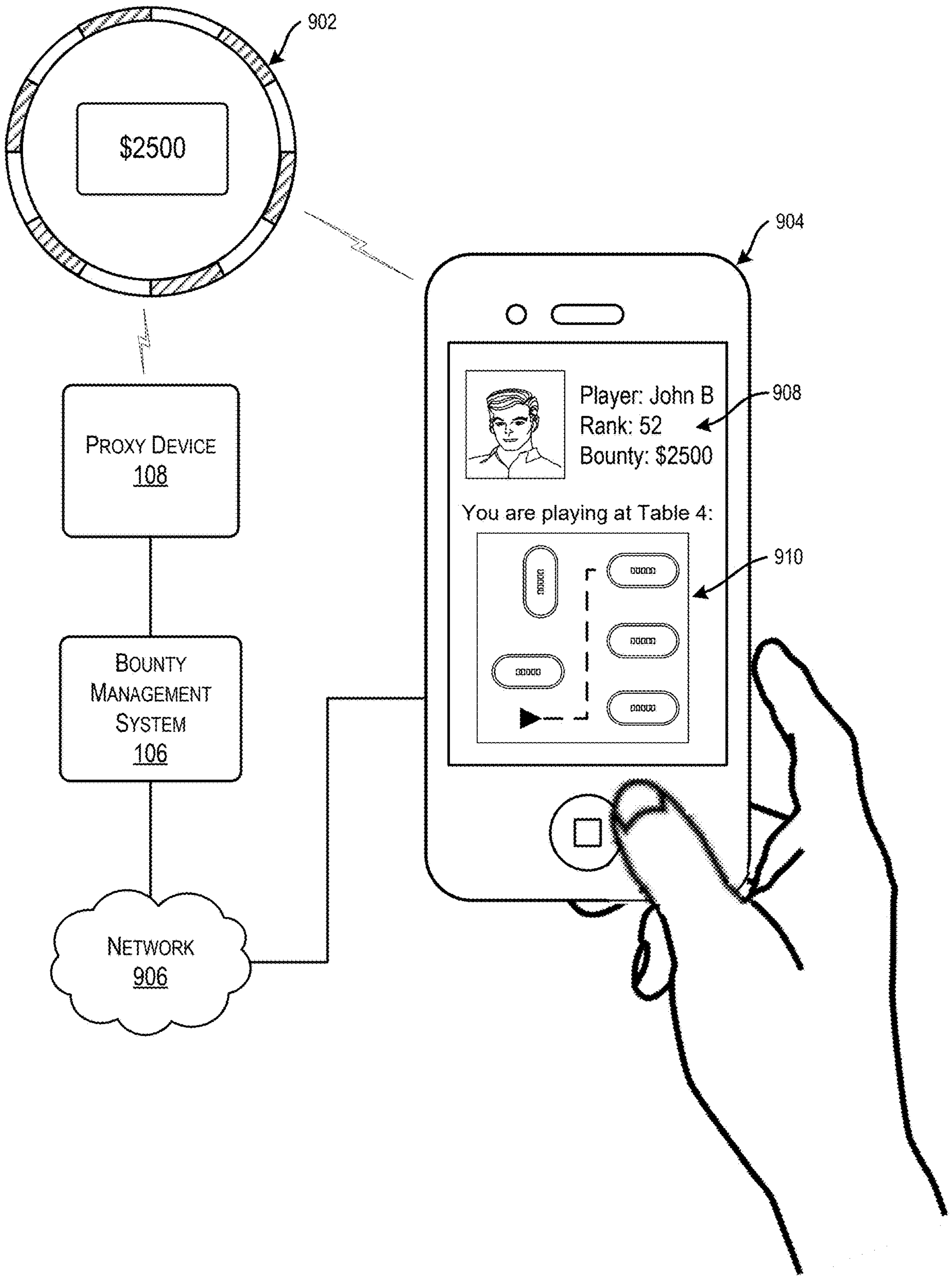
FIG. 9 depicts exemplary interactions that may occur between a bounty tracking device and a user equipment device in accordance with some embodiments.

FIG. 9 depicts exemplary interactions that may occur between a bounty tracking device and a user equipment device in accordance with some embodiments. In FIG. 9, a bounty tracking device 902 is depicted as interacting with a user equipment device 904. The user equipment device 904 may be in communication with a bounty management system 106 over a network 906. As noted elsewhere, the bounty management system 106 may be in communication with a proxy device 108 that is capable of communicating with the bounty tracking device 902.

The user equipment device 904 may be any suitable electronic device operated by a user. By way of non-limiting example, the user equipment device 904 may include an RFID reader that is capable of interacting with an RFID tag included in the respective bounty tracking device 902. Upon bringing the bounty tracking device 902 into proximity of the user equipment device 904, the RFID reader of the user equipment device 904 may be configured to receive information that can be used to identify the bounty tracking device 902. For example, the RFID reader may receive a unique identifier associated with the bounty tracking device from the RFID tag.

Upon receiving information that can be used to identify the bounty tracking device 902, the user equipment device 904 may be configured to communicate at least a portion of that information to the bounty management system 106. In some cases, the user equipment device 904 may be configured to execute a software application associated with the bounty tracking system as disclosed herein in order to facilitate communication with the bounty management system 106. In embodiments, the communication between the user equipment device 904 and the bounty management system 106 may occur over a network 906. In some cases, the network 906 may be an external network (such as a cellular network) operated by a third-party network carrier. In some cases, the network 906 may include an external data network, such as the Internet.

In response to receiving, from the user equipment device 904, an indication of an identifier for the bounty tracking device 902, the bounty management system 106 may be configured to respond by providing information/instructions to the user equipment device 904. Such information may be information that is associated with the bounty tracking device 902. For example, the information may include an indication of a player identifier or player data 908 associated with the bounty tracking device. In another example, the information may include an indication of a target location or tournament instructions associated with the bounty tracking device 902.

In embodiments, the user equipment device 904 may be configured to display (or otherwise present) at least a portion of the information that it receives from the bounty management system. As noted above, such information may be presented in relation to a software application being executed on the user equipment device 904. In some cases, the user equipment device 904 may be configured to present at least a portion of player data 908 received from the bounty management system 106. In some cases, the user equipment device 904 may be configured to generate instructions to be provided to an operator of the user equipment device 904 based on the provided information. For example, the user equipment device 904 may include a global positioning system (GPS) device that is capable of determining/tracking a current location of the user equipment device 904. In such cases, the information received from the bounty management system 106 may include a map (or other suitable indication of a geographical region or area) as well as an indication of a location to be visited by a player (e.g., a table at which the player is scheduled to play a game). In such cases, the user equipment device 904 may be further configured to display a map having a current location of the player as well as instructions that can be used to find the location to be visited by that player. This enables the user equipment device 904 to quickly direct the player to a respective game/table while minimizing interactions by that player.

In some cases, a software application executed on the user equipment device 904 may be configured to present at least some portion of player-related data only if login credentials are provided to access the software application. In such cases, the login credentials may represent a password, PIN, or other suitable access credential stored in relation to an account maintained in relation to the player currently associated with the bounty tracking device 904.

In some embodiments, the bounty tracking device 902 may be associated with an administrator or other type of user with additional access/privileges. For example, in addition to players, the bounty management system 106 may maintain accounts associated with dealers that are charged with managing/administrating a game. In such cases, the administrator may be issued a bounty tracking device 902 and the bounty management system 106 may be configured to provision information onto that bounty tracking device that is indicative of an administrator/dealer. It should be noted that a software application executed on the user equipment device 904 may provide different/additional functionality when associated with an administrator versus when associated with a player. Notably, the user equipment device 904 may perform the functionality as described in relation to the administrator device 612 of FIG. 6.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A proxy device comprising:
a wireless transceiver;
one or more processors; and
one or more computer readable media storing computer executable instructions which, when executed using the one or more processors, cause the proxy device to perform operations comprising:
receiving, via a first short-range wireless communication initiated responsive to a first bounty tracking device being presented to the proxy device, an indication of the first bounty tracking device and a first bounty amount stored in a first local memory of the first bounty tracking device;
receiving, via a second short-range wireless communication initiated responsive to a second bounty tracking device being presented to the proxy device, an indication of the second bounty tracking device and a second bounty amount stored in a second local memory of the second bounty tracking device, wherein the first bounty tracking device and the second bounty tracking are associated with an elimination event;
causing a current bounty amount to be generated based on the first bounty amount and the second bounty amount; and
providing instructions to the second bounty tracking device to cause it to store the current bounty amount in the second local memory, wherein the second bounty tracking device is configured to present an indication of the current bounty amount via one or more output component.

2. The proxy device of claim 1, wherein the operations further comprise providing instructions to the first bounty tracking device to cause it to zero out the first bounty amount in the first local memory.

3. The proxy device of claim 1, wherein the current bounty amount is generated by a bounty management system in communication with the proxy device.

4. The proxy device of claim 1, wherein the current bounty amount is generated by the second bounty tracking device.

5. The proxy device of claim 1, wherein the proxy device comprises a gateway device that manages access to a wireless network on which the first bounty tracking device and the second bounty tracking device are operating.

6. The proxy device of claim 1, wherein the first short-range wireless communication and the second short-range wireless communication are received via a Radio Frequency Identifier (RFID) reader or a Bluetooth communication device in communication with the proxy device.

7. The proxy device of claim 1, wherein the operations further comprise performing an authentication of at least one of the first bounty tracking device or the second bounty tracking device.

8. The proxy device of claim 7, wherein performing an authentication of the first bounty tracking device comprises:
receiving a first verification value from the first bounty tracking device; and
comparing the first verification value against an independently generated second verification value, wherein the first bounty tracking device is authenticated if the first verification value matches the second verification value.

9. The proxy device of claim 8, wherein performing an authentication of the first bounty tracking device further comprises providing a challenge value to the first bounty tracking device, wherein the first verification value is generated based at least in part on the challenge value.

10. The proxy device of claim 1, wherein the elimination event relates to one of a tournament or gaming event.

11. A method comprising:
receiving, via a first short-range wireless communication initiated responsive to a first bounty tracking device being presented to a proxy device, an indication of the first bounty tracking device and a first bounty amount stored in a first local memory of the first bounty tracking device;
receiving, via a second short-range wireless communication initiated responsive to a second bounty tracking device being presented to the proxy device, an indication of the second bounty tracking device and a second bounty amount stored in a second local memory of the second bounty tracking device, wherein the first bounty tracking device and the second bounty tracking device are associated with an elimination event;
causing a current bounty amount to be generated based on the first bounty amount and the second bounty; and
providing instructions to the second bounty tracking device to cause it to store the current bounty amount in the second local memory, wherein the second bounty tracking device is configured to present an indication of the current bounty amount via one or more output component.

12. The method of claim 11, wherein the one or more output component comprises a display screen of the second bounty tracking device, and the second bounty tracking device is configured to present a numeric value on the display screen.

13. The method of claim 11, wherein the one or more output component comprises a lighting element, and the second bounty tracking device is configured to emit light in a color associated with the current bounty amount.

14. A bounty tracking system comprising:
a first bounty tracking device configured to:
provide, via a first short-range wireless communication initiated responsive to the first bounty tracking device being presented to a proxy device, first bounty information including a first bounty amount stored in a first local memory of the first bounty tracking device to the proxy device;
a second bounty tracking device configured to:
provide, via a second short-range wireless communication initiated responsive to the second bounty tracking device being presented to the proxy device, second bounty information including a second bounty amount stored in a second local memory of the second bounty tracking device to the proxy device, wherein the first bounty tracking device and the second bounty tracking device are associated with an elimination event;
receive, from the proxy device, instructions to store a current bounty amount in the second local memory, wherein the current bounty amount is based on the first bounty amount and the second bounty amount; and
present, using one or more output component, an indication of the current bounty amount; and
the proxy device configured to:

receive the first bounty information from the first bounty tracking device via the first short-range wireless communication and receive the second bounty information from the second bounty tracking device via the second short-range wireless communication;

cause the current bounty amount to be generated based on the first bounty amount and the second bounty amount; and provide the instructions to the second bounty tracking device.

15. The bounty tracking system of claim 14, wherein the first bounty tracking device is further configured to zero out the first bounty amount stored locally in the first local memory.

16. The bounty tracking system of claim 14, wherein the current bounty amount is generated by the second bounty tracking device.

17. The bounty tracking system of claim 14, further comprising a bounty management system in communication with the proxy device, wherein the current bounty amount is generated by the bounty management system.

18. The bounty tracking system of claim 14, wherein the one or more output component comprises a lighting element and presenting the indication of the current bounty amount comprises causing the lighting element to emit a color of light representative of the current bounty amount.

19. The bounty tracking system of claim 14, wherein the one or more output component comprises a speaker and the second bounty tracking device is further configured to play an audio clip.

* * * * *